US006647787B2

(12) United States Patent
Fore

(10) Patent No.: US 6,647,787 B2
(45) Date of Patent: Nov. 18, 2003

(54) ACCELERATION RECORDER

(76) Inventor: Frank A. Fore, 40 E. Riverside Dr., Jupiter, FL (US) 33469

(*) Notice: Subject to any disclaimer, the term of this patent is extended or adjusted under 35 U.S.C. 154(b) by 0 days.

(21) Appl. No.: 10/035,678

(22) Filed: Dec. 28, 2001

(65) Prior Publication Data

US 2003/0121329 A1 Jul. 3, 2003

(51) Int. Cl.[7] .................................................. G01P 3/04

(52) U.S. Cl. ....................................................... 73/510

(58) Field of Search ............................. 73/514.01, 510, 73/511, 514.16, 514.35

(56) References Cited

U.S. PATENT DOCUMENTS

| 3,781,824 A | * | 12/1973 | Caiati et al. ............... 346/33 R |
| 3,931,747 A | * | 1/1976 | Erspamer .................... 74/5.34 |
| 4,831,510 A | * | 5/1989 | Dummermuth et al. ........ 700/56 |
| 5,551,279 A | | 9/1996 | Quick |

* cited by examiner

Primary Examiner—Hezron Williams
Assistant Examiner—Tamiko Bellamy
(74) Attorney, Agent, or Firm—McHale & Slavin, P.A.

(57) ABSTRACT

The acceleration recorder provides a three dimensional mechanical record of the acceleration sustained in a collision or impact. The recorder converts impact into a rotational movement of an internal weight about three orthoganl axes. Mechanical indicators remain at the limits of the weight rotations.

8 Claims, 6 Drawing Sheets

ACCELERATION RECORDER

FIELD OF THE INVENTION

The acceleration recorder of this invention is related to the field of collision dynamics and in particular to a recordation mechanism capable of detecting the magnitude of acceleration, in all three axes of a an orthogonal Cartesian coordinate system X, Y, and Z, that an object has been exposed to during an impact or collision.

BACKGROUND OF THE INVENTION

Millions, if not billions, of dollars are paid out each year, in the United States alone, as a result of injuries due to accidents, crashes or collisions. A significant amount of this is due to fraudulent claims based on minor accidents or, in some instances, no accident at all. Conversely, many legitimate claims go unpaid because the injured are unable to verify the extent of the impact and their injuries. In view of this problem, attorneys typically retain professional engineers to perform forensic analyses using available techniques to determine the accelerations of a crash or collision. Thus, it is recognized that there is a need to be able to determine the accelerations a person, vehicle or other object has been subjected to in a collision. By having a means for recording and determining the severity of a collision, the evaluation of the resulting injuries could be more accurate and expedient.

At present, most serious accidents involving bodily injuries are subjected to extensive forensic analysis. By examining the physical evidence, such as skid marks, weight and geometry of the colliding vehicles, points of impact and rest, and the resultant damage of a collision, the approximate forces of an impact may be calculated. The calculated forces can then be utilized to calculate the approximate average accelerations the occupants experienced in the collision. The three-dimensional acceleration vector determines, to a great extent, the injuries to the occupants; however, these analyses are typically only in two dimensions.

The National Highways and Transportation Safety Administration (NHTSA) of the U. S. Department of Transportation has conducted numerous barrier tests to determine the stiffness properties of various types of vehicles. The weight of the vehicle, the speed at impact and the exact amount of resultant damage are recorded. Utilizing Newton's Law of Motion and Hooke's Spring Law, the impact forces and resultant stiffness properties are calculated. In future investigations of similar vehicles, the somewhat linear nature of vehicle stiffness allows investigators to approximate impact forces based on varying amounts of collision damage. These calculated forces could then be used in occupant acceleration calculations; however, the results only proximate the actual accelerations endured by the occupants.

Calculating head accelerations during athletic event impacts is even more challenging. Numerous sports involve the potential for significant head impacts during play; most notably among these sports is football. Repetitive head impacts involving high accelerations have been medically shown to cause permanent brain injury and death; however, no current method exists to determine the magnitude of each impact. In fact, unconsciousness is often used to differentiate between an acceptable and unacceptable impact. Unfortunately, the levels of force required to render an individual unconscious is often significantly higher than the forces required to injure the brain.

Now, there is no generally accepted small, light weight and inexpensive instrumentation that requires no batteries or external power and can be mounted on any vehicle or athletic protective gear, such as a helmet, to record the acceleration vector experienced by the participants of a collision or impact.

This invention is directed to providing an instrument that could be included as standard safety equipment on every vehicle and helmet.

DESCRIPTION OF THE PRIOR ART

Impact measuring devices are old in the art. For example, U.S. Pat. No. 5,551,279 describes a mechanical impact gauge for determining cumulative impact energy along a single axis using fixed bendable members within a chamber on either side of a freely movable object. Upon impact, the inertia of the movable object will cause the object to bend the fixed members. The amount of the bend can be used to calculate the force of impact.

When the device is aligned with the vector of the impact, the information derived is relatively accurate; however, if the impact vector is at an angle to the axis of the device, only the longitudinal portion of the vector is recorded and the gauge can become very inaccurate.

Of course, the "black boxes" carried by some commercial aircraft and in the airplanes of all commercial air carriers give detailed information about an accident. These devices are relatively large, very expensive and most have a continuous power source. Such sophisticated instrumentation, and it's cost, would place an undue burden on the price of individually owned vehicles and would be impossible to mount on a helmet.

SUMMARY OF THE INVENTION

Any moving object may be equipped with one or more acceleration recorders of this invention, such as boats, cars, trucks, buses, airplanes, motorcycles, or helmets. During a collision, the acceleration recorder gives empirical data concerning the vectored acceleration of the object to which the recorder is attached. The data can be used to reconstruct the direction and magnitude of any collision. When two or more recorders are used in conjunction rotational accelerations can also be derived.

Accordingly, it is an objective of the instant invention to provide an acceleration recorder that is inexpensive, small, lightweight and easy to permanently or removably mount on any vehicle or helmet. It is also an objective of this invention to provide an acceleration recorder that records acceleration in three orthogonal axes to provide a vector of the acceleration involved in a collision or impact.

It is a further objective of the instant invention to provide an acceleration recorder that may be tamper-proof or user inaccessible.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

For the purposes of this disclosure, the acceleration recorder will be described as mounted on a base that is parallel with the ground and the Z-axis resolver mounted vertically there from. While each axis has been labeled for clarity, it is understood that the labels merely specify any three orthogonal axes in a three dimensional coordinate system. For simplicity of description, like parts have the same reference number where possible.

Figure 1:
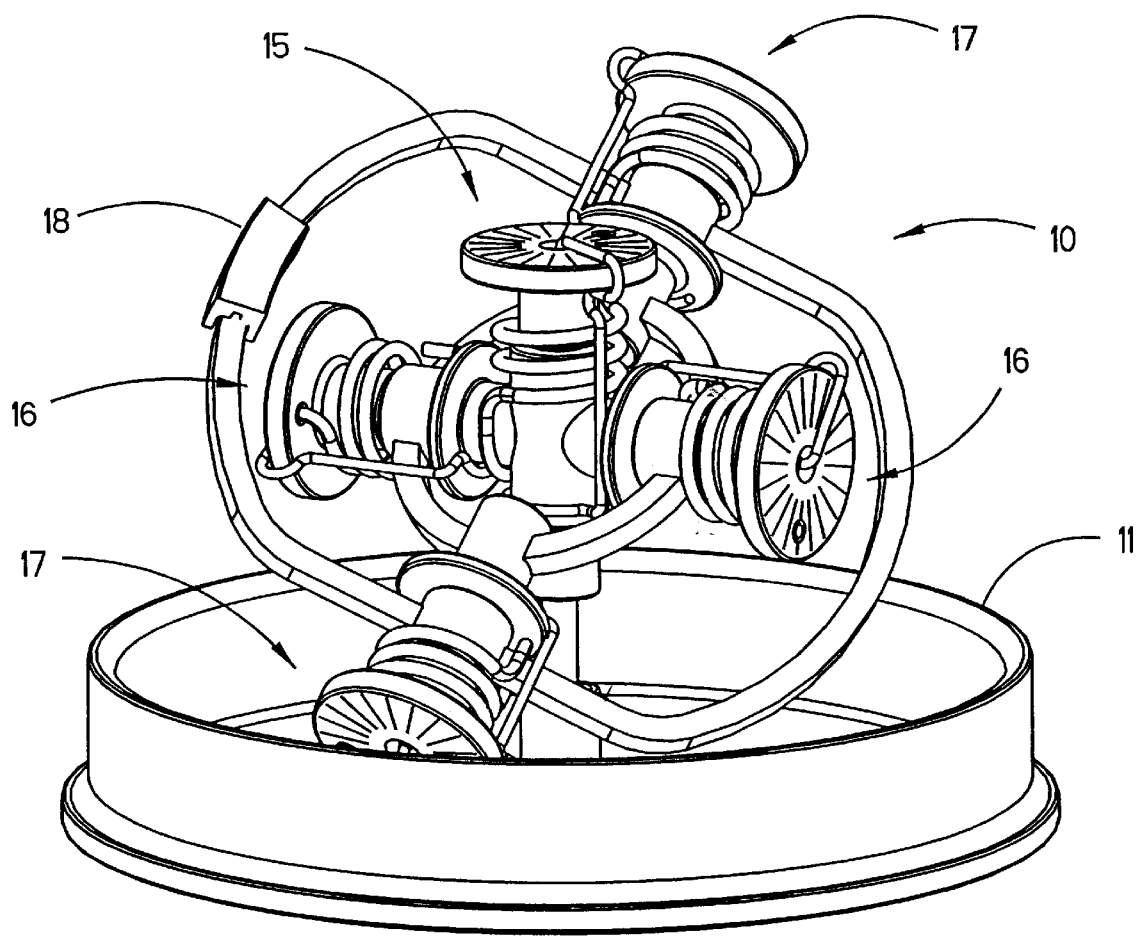
FIG. 1 is a perspective of the acceleration recorder of this invention.

Of course, during use, the acceleration recorder will be subject to its orientation relative to the vehicle, helmet or test bed upon which it is mounted. As part of the forensic analyses, the orientation of the acceleration recorder during the event must be determined for accurate reconstruction. The acceleration recorder 10, shown in FIG. 1. is mounted on a base 11. The base 11 is mounted on a vehicle or athletic protective gear, such as a helmet. Depending on the circumstances of use, the base may be mounted using a double-faced adhesive 12, shown in FIG. 2.

Where it is desired to make the device tamper-proof or to determine if the recorder has been tampered with, the base may be permanently attached to the vehicle, as by bolts, welding or such, not shown. The base 11 has a peripheral wall 13, shown in FIG. 2, which may be permanently fixed to a protective covering 14. The protective covering 14 closely fits about the wall 13 and prevents foreign objects from fouling the moving parts of the recorder 10 and is designed to withstand a greater impact than the accelerations the recorder has the capability of measuring. In some instances, the protective covering may be made of transparent acrylic. The protective covering may also be removably mounted on the base, in some applications.

In FIGS. 1, 4, 5 and 6, the acceleration recorder 10 has a Z-axis resolver 15, two Y-axis resolvers 16 and two X-axis resolvers 17. Each of these resolvers simultaneously and permanently records the maximum rotational displacement of a weight 18 relative to base 11 during impact. The rotation about three orthogonal axes is recorded so that a three dimensional vector of acceleration can be deduced.

Figure 2:
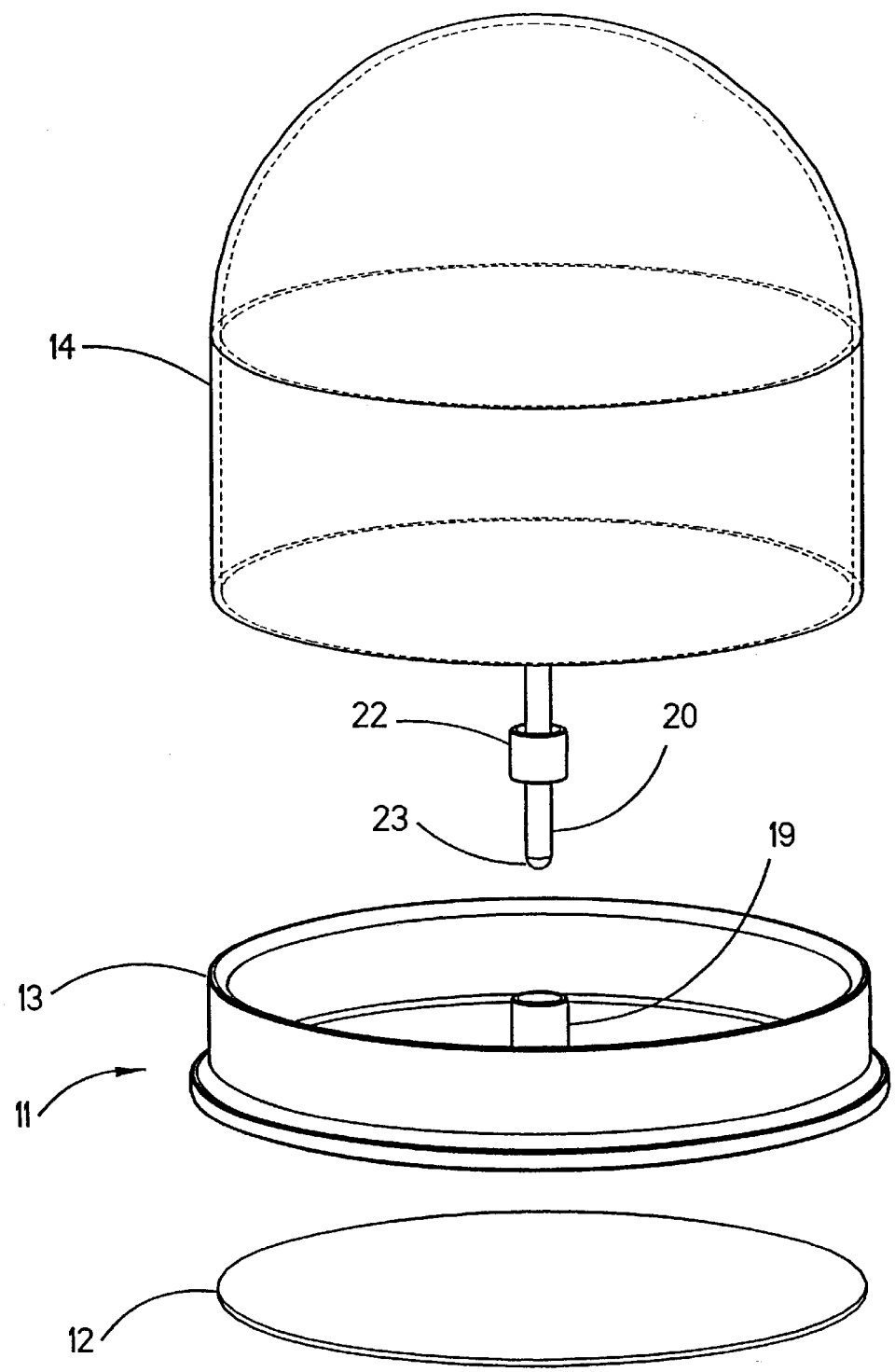
FIG. 2 is an exploded, perspective view of the base and tamper-proof shield.
Figure 3:
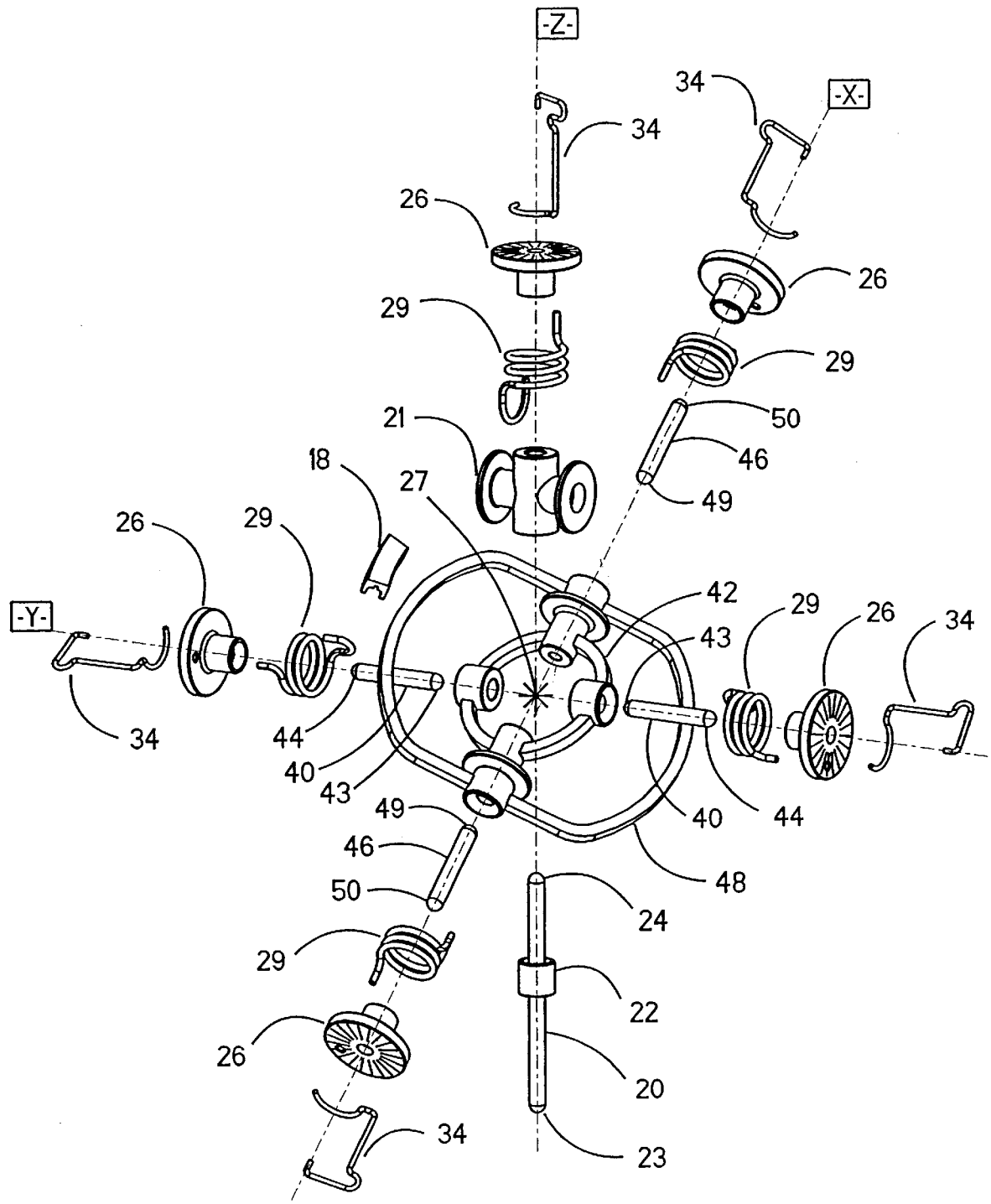
FIG. 3 is an exploded, perspective view of the acceleration recorder.
Figure 4:
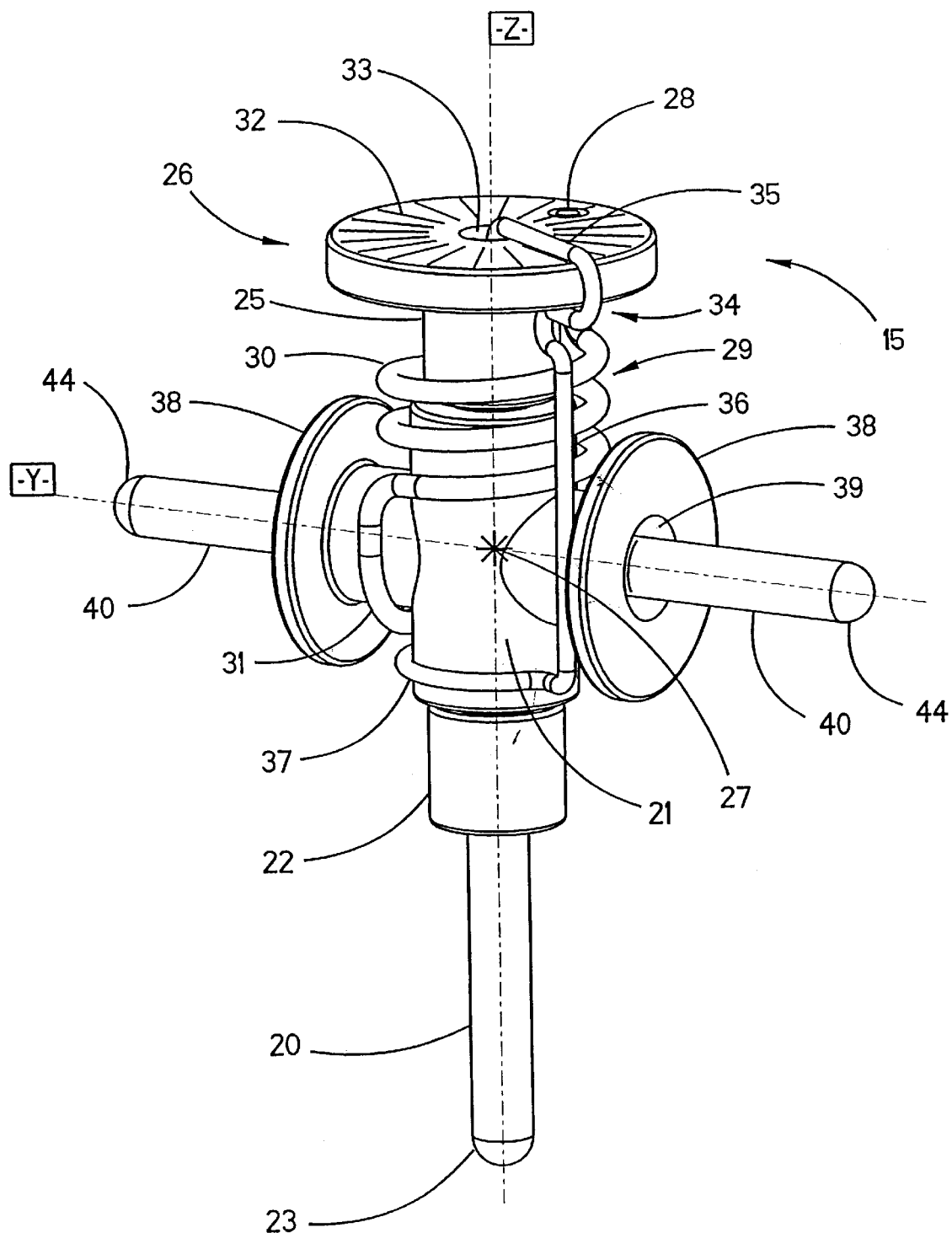
FIG. 4 is a perspective of the Z-axis resolver and the cruciform casing.

In FIGS. 2, 3 and 4, the base 11 has a circular bearing journal 19 that receives a spindle 20 of the Z-axis resolver 15. The spindle 20 extends upwardly from the bearing journal through a cruciform casing 21. A collar 22 is formed on the spindle 20 for vertical support of the cruciform casing 21. The ends of spindle 20 have bearing surfaces 23 and 24. Bearing surface 23 is connected in bearing journal 19 and bearing surface 24 is connected to a journal 25 in the center of a disk 26. The rotational and translational position of disk 26 is fixed relative to base 11. The cruciform casing 21 rotatably rests on spindle 20 between the journal 25 and the collar 22. The cruciform casing rotates about an imaginary center point 27 and serves to establish the perpendicular relationship between the Y and Z-axes of the recorder 10.

The disk 26 also has an eccentric aperture 28. One end of a coil spring 29 is connected to the lower surface of the disk 26 in the eccentric aperture 28. The spring extends downwardly from the disk and the coils 30 freely wrap around the journal 25 and the cruciform casing 21 ending in a hook shaped attachment 31 about a horizontal arm of the cruciform casing. The spring 29 is connected to the cruciform casing 21 so that rotational movement of the cruciform casing relative to the disk 26 is resisted by the spring. The force produced by spring 29 is directly proportionate to the angular displacement of cruciform casing 21.

When the object upon which the recorder 10 is mounted experiences a sudden change in position or velocity, the base 11 experiences the same change, resulting in rotation and translation of the disk 26 from its original position. Due to inertial resistance to a change in position or velocity, the weight 18 remains stationary when the base moves. This results in a rotation of cruciform casing 21. The coil spring 29 provides a reactive force on the cruciform casing in response. When the limit of rotational and translational acceleration is reached, the spring returns the cruciform casing to its neutral position relative to base 11.

The disk 26 has angular calibrations 32 on the upper surface about a central aperture 33. The calibrations 32 indicate the angular displacement of the cruciform casing 21 relative to the disk 26 during a collision. The calibrations may serve to directly record the rotational displacement of the Y-axis about the Z-axis or they maybe used as a basis of calculations to determine the acceleration necessary to cause the indicated angular movement.

An elongated indicator 34 has one end rotatably journaled in the central aperture 33 of the upper surface of the disk 26. The indicator has an arm 35 that extends radially outward from the end journaled in the central aperture parallel to the upper surface of the disk, over the calibrations 32, beyond the circumferential edge of the disk, and loops back below and parallel to the lower surface of the disk. The middle portion 36 of the indicator is disposed parallel to the journal 25 and ends in a curved portion 37 which is fitted around and coaxial to the cruciform casing 21 below the horizontal arms. As the cruciform casing rotates relative to disk 26, the indicator 34 is pushed by the horizontal arms of the cruciform casing causing the arm 35 to rotate over calibrations 32. The horizontal arms of the cruciform casing have flanges 38. The flanges 38 serve as the retainer for the curved portion 37 of the indicators 34 in the Y-axis resolvers 16, shown in FIG. 5.

After the spring 29 returns the cruciform casing 21 to its neutral position, the indicator 34 remains at the farthest extent of rotation during impact. The magnitude of rotation of indicator 34 is determined by comparing arm 35 relative to calibrations 32 before and after impact. The indicator 34 maintains position through the tension in the loop of arm 35. This tension is insignificant compared to the inertial forces of the cruciform casing 21 and attached hardware; however, the tension is enough to retain the indicator arm 35 in its original position or the position where it comes to rest as a result of an impact.

Figure 5:
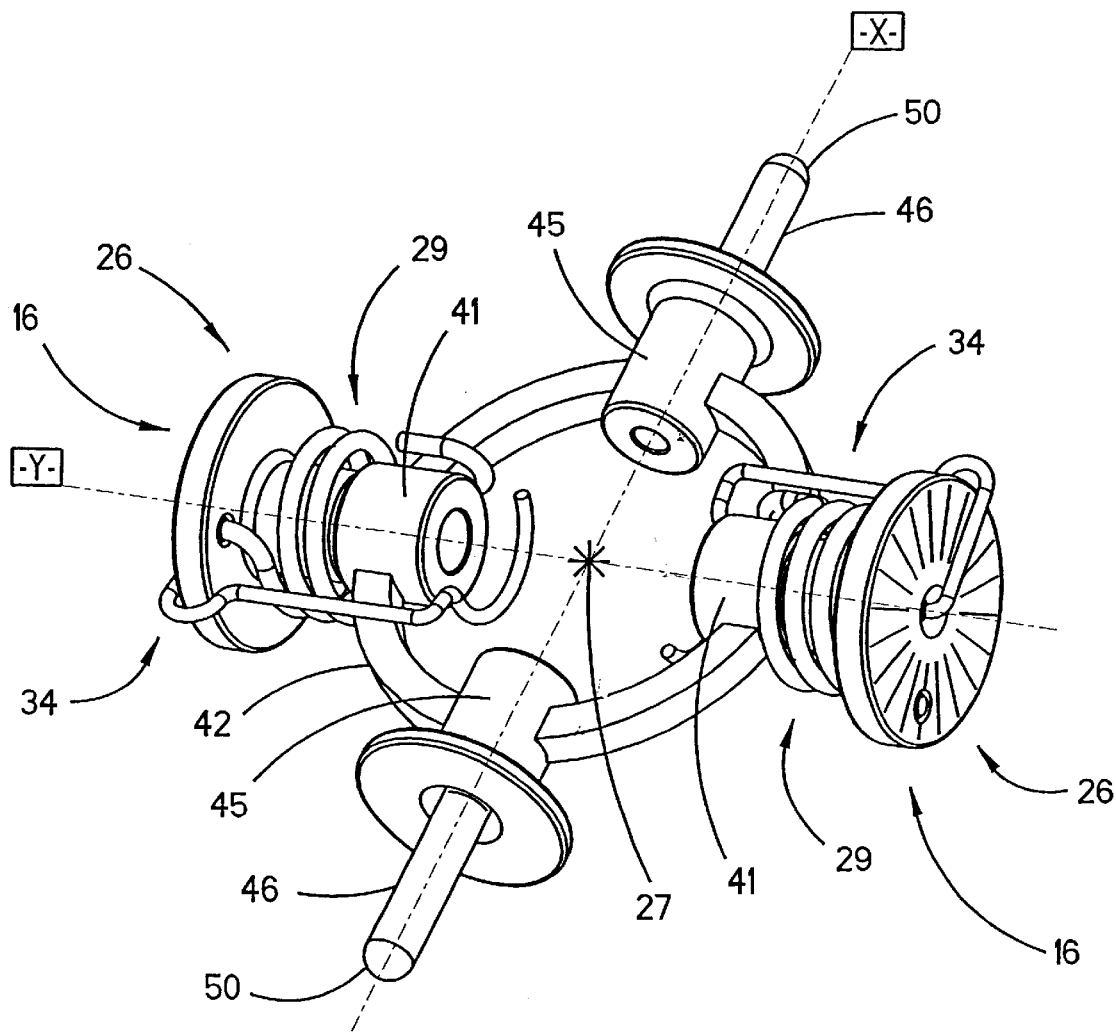
FIG. 5 is a perspective of the Y-axis resolvers and the inner orbit ring.

In FIGS. 3, 4 and 5, the Y-axis resolvers 16 are mounted at 180 degrees angle from each other on the horizontal arms of cruciform casing 21. The cruciform casing has two bearing journals 39; each receives a spindle 40. The two spindles 40 extend radially outward from the bearing journals 39 through bearing journals 41 in an inner orbit ring 42. The ends of each spindle 40 have bearing surfaces 43 and 44. Bearing surface 43 is connected in journal 39 and bearing surface 44 is connected in journal 25 in the center of disk 26. The positions of disks 26 are fixed relative to cruciform casing 21. The ring 42 rotatably rests on spindles 40 between the cruciform casing 21 and journals 25. The ring 42 rotates about center point 27 and serves to establish the perpendicular relationship between the X and Y-axes of the recorder 10. The calibrations 32 on disks 26 of the Y-axis resolvers indicate the angular displacement of ring 42 relative to the cruciform casing 21 during a collision.

Coil springs 29 of the Y-axis resolvers 16 are connected to the ring 42 so that rotational movement of the ring relative to the cruciform casing 21 is resisted by the springs. The force produced by the springs is directly proportional to the angular displacement of ring 42 relative to cruciform casing 21. The springs provide the reactive force on the ring 42 in response to a change in the position or velocity of the cruciform casing 21. When the limit of rotational and translational acceleration is reached, the springs return the ring 42 to its neutral position relative to cruciform casing 21.

Figure 6:
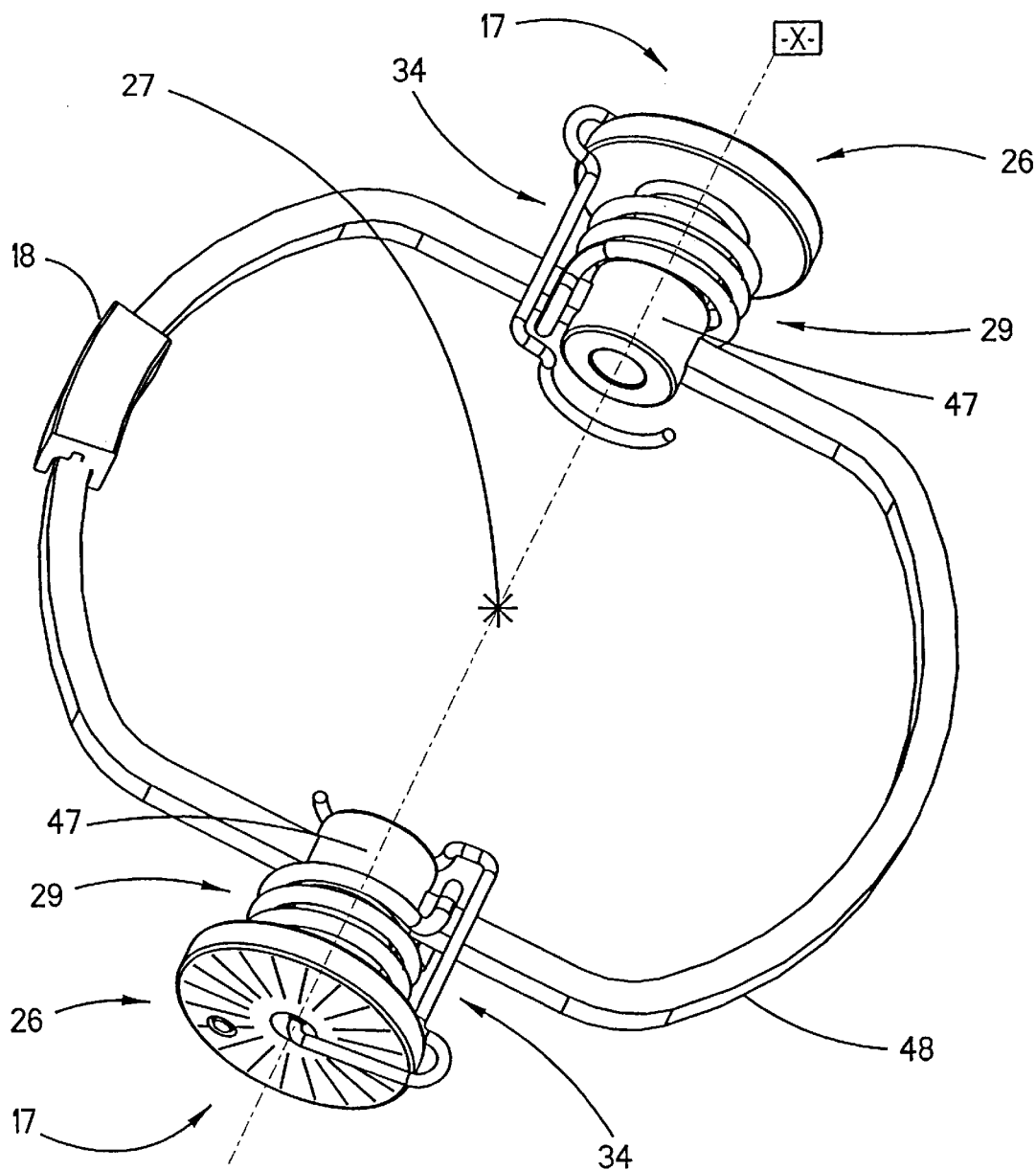
FIG. 6 is a perspective of the X-axis resolvers and the outer orbit ring.

In FIGS. 3, 5 and 6, the X-axis resolvers 17 are mounted at 180 degrees angle from each other on the ring 42. The ring 42 has bearing journals 45 that receive spindles 46. The spindles 46 extend radially outward from the bearing journals 45 through bearing journals 47 in an outer orbit ring 48. The ends of spindles 46 have bearing surfaces 49 and 50. Bearing surface 49 is connected in journal 45 and bearing surface 50 is connected in journal 25 in the center of disk 26. The positions of disks 26 are fixed relative to ring 42. The ring 48 rotatably rests on spindles 46 between the ring 42 and journals 25 and in a greater orbit than ring 42. The ring 48 carries weight 18 which may be made of lead. The weight 18 provides the inertial force relative to the base to initiate rotation about one or more of the three axes. The ring 48 rotates about a center point 27 and serves to establish the angular relationship between weight 18 and the X-axis of the recorder 10. The calibrations 32 on disks 26 of the X-axis resolvers indicate the angular displacement of ring 48 relative to the ring 42 during a collision.

Coil springs 29 of the X-axis resolvers are connected to the ring 48 so that rotational movement of ring 48 relative to ring 42 is resisted by the coil springs. The force produce by springs is directly proportionate to the angular displacement of ring 48 relative to ring 42. The springs provide the reactive force on the ring 48 in response to a change in the position or velocity of the ring 42. When the limit of rotational and translational acceleration is reached, the springs return the ring 48 to its neutral position relative to ring 42.

In a sudden collision, when a vehicle or helmet abruptly changes location, the attached base 11 and point 27 will translate and rotate exactly the same as the vehicle or helmet. Newton's Law of Motion states, "a mass at rest or constant velocity stays at rest or constant velocity until acted on by an outside force." Therefore, the weight, which is free to move in all three directions, stays at rest or continues on its current trajectory. This results in an angular rotation of the weight about one or more of the three axes. The increasing rotations create increasing torsional forces from the coil springs and a simultaneous movement of the indicators about their respective disks. Eventually, the resultant combined force created by the springs becomes equal to the force required to accelerate the weight to the new neutral position and relative speed of base 11. When the weight achieves the new neutral position and speed of base 11, the spring tension unloads and the system reaches equilibrium. After the weight is returned to it's neutral position, the indicators will register the three rotational limits achieved during the collision.

It is to be understood that while a certain form of the invention is illustrated, it is not to be limited to the specific form or arrangement of parts herein described and shown. It will be apparent to those skilled in the art that various changes may be made without departing from the scope of what is shown and described in the specification and drawings.

What is claimed is:

1. A acceleration resolver for use in an acceleration recorder to record the magnitude of acceleration said resolver experiences, said resolver comprising a housing, spindles extending orthogonally through said housing, disks having central apertures and eccentric apertures, said disks having markings about said central apertures, said spindles coaxially aligned with said central apertures, coil springs disposed around said housing, said coil springs having one end engaging said eccentric aperture and the other end fixedly connected to said housing, and an elongated indicator having one end movably connected to said housing and an intermediate portion extending over said disk above said markings and the other end located in said central aperture, said elongated indicator under spring tension against said disks, whereby acceleration applied to said impact recorder produces proportional rotation of said housing and said elongated indicator, and said spring tension between said indicator and said disk fixing said indicator at the limit of rotation.

2. An acceleration resolver of claim 1 wherein said housing is cruciform tubular and said disk has a circular skirt in circumferential contact with said tubular housing.

3. An acceleration resolver of claim 2 wherein said housing has a flange and one end of said elongated indicator is frictionally connected to said flange.

4. An acceleration recorder for determining the acceleration involved in two axes of a collision comprising a base, a cruciform casing with four perpendicular legs with one leg mounted on said base, a rotatable Z-axis resolver having a spindle mounted on the opposite leg above said base, said Z-axis resolver having a disk rotatably mounted on said spindle, two rotatable Y-axis resolvers having disks rotatably mounted on opposite legs of said cruciform casing normal to said Z-axis resolver 180 degrees apart, said Y-axis resolvers connected to each other by a first ring defining a first plane, disposed about said cruciform casing, each of said disks on said Y-axis and said Z-axis resolvers having an eccentric aperture, each resolver having a coil spring with one end fixedly connected and freely wrapped about said resolver, the other end of said coil spring connected to said eccentric aperture, and an elongated indicator having one end slidably connected about a leg of said cruciform casing with the other end resiliently rotatably connected to said disk, whereby a change in inertia causes said coil spring to rotate said disk and said indicator and said resilient connection retains said indicator at the limit of rotation.

5. An acceleration recorder of claim 4 for determining the acceleration involved in three axes of a collision including two X-axis resolvers connected to said first ring 180 degrees from each other and 90 degrees from each Y-axis resolver, said X-axis resolvers connected to each other by a second ring having a diameter greater than said first ring, said second ring defining a second plane said second plane oriented normal to said first plane.

6. An acceleration recorder of claim 5 wherein said base is connected to a vehicle.

7. An acceleration recorder of claim 5 wherein said base is connected to a helmet.

8. An acceleration recorder of claim 5 wherein said resolvers have a central elongated spindle and said disk has a central aperture, said disk coaxially fixed on said spindle at one end of said spindle.

* * * * *